United States Patent [19]

Orain

[11] Patent Number: 4,808,144
[45] Date of Patent: Feb. 28, 1989

[54] HOMOKINETIC TRANSMISSION JOINT FOR MOTOR VEHICLES

[75] Inventor: Michel A. Orain, Conflans Ste Honorine, France

[73] Assignee: Glaenzer Spicer, Poissy, France

[21] Appl. No.: 11,859

[22] Filed: Feb. 4, 1987

[30] Foreign Application Priority Data

Feb. 20, 1986 [FR] France .................. 86 02322

[51] Int. Cl.⁴ .............................................. F16D 3/20
[52] U.S. Cl. ...................... 464/111; 384/219;
384/281; 384/295; 464/132; 464/905
[58] Field of Search ............... 384/215, 219, 280, 281, 384/295; 464/111, 120, 123, 132, 905

[56] References Cited

U.S. PATENT DOCUMENTS

| | | | |
|---|---|---|---|
| 1,118,457 | 11/1914 | Windisch | 384/281 |
| 1,942,578 | 1/1934 | Stockfleth . | |
| 2,481,931 | 9/1949 | Kester | 384/281 |
| 2,594,587 | 4/1952 | Riordan | 384/281 |
| 2,952,144 | 9/1960 | Holmes, Jr. | 464/132 |
| 3,168,320 | 2/1965 | Sneed | 384/215 X |

FOREIGN PATENT DOCUMENTS

2133042 11/1972 France .
2525306 10/1983 France .
916297 1/1963 United Kingdom .

*Primary Examiner*—Daniel P. Stodola
*Attorney, Agent, or Firm*—Wenderoth, Lind & Ponack

[57] ABSTRACT

The joint comprises a male element drive in rotation by a driving shaft (AM) and provided with radial arms (340) on each of which are mounted two rolling segments (310) trapped in rolling tracks (R) of a female element (312), expansible elastically yieldable bearing bushings (600) interposed between the arms (340) and the rolling segments (310), each bushing being formed by two semi-cylindrical semi-bushings (600) which are prevented from moving axially and in rotation relative to the arm (340) and are radially expansible. Each semi-bushing (600) is provided with a stud (410) for locating it on the associated arm (340), this stud being placed inside the semi-bushing on the axis of symmetry (Y—Y') of the latter. This arrangement avoids any risk of breakage of the bushings when the joint is operating at maximum angularity by avoiding any sudden increase in the retaining force of the locating studs in this extreme position of the joint.

19 Claims, 7 Drawing Sheets

HOMOKINETIC TRANSMISSION JOINT FOR MOTOR VEHICLES

BACKGROUND OF THE INVENTION

1. Field of the Invention

The present invention relates to improvements in a homokinetic transmission joint for motor vehicles.

2. Description of the Prior Art

Figure 1:
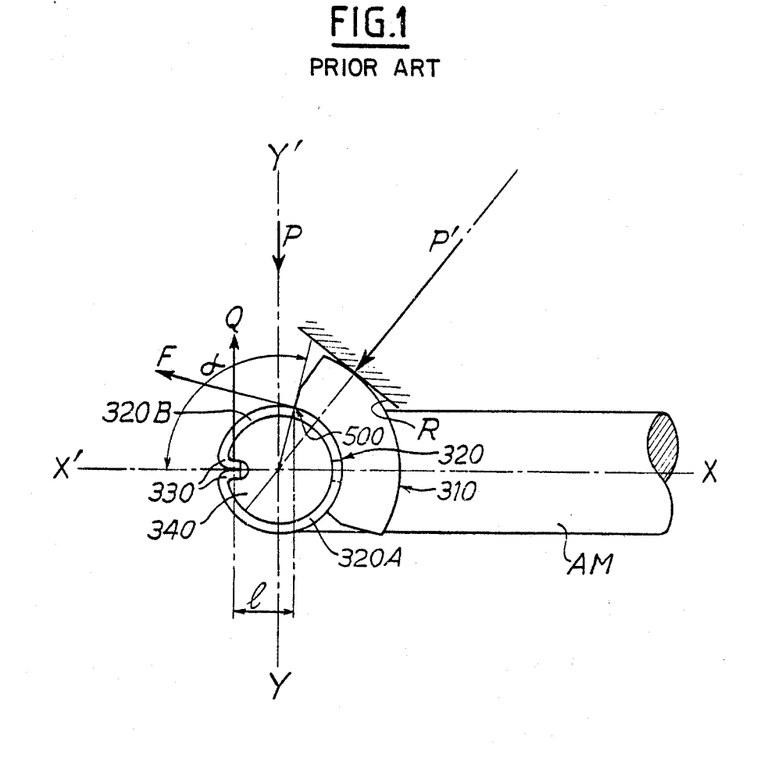
FIG. 1 is a partial elevational view of a known homokinetic joint of the type to which the invention relates.

A homokinetic transmission joint is known which is partly represented in the accompanying FIG. 1 and comprises a male element capable of being driven in rotation by a driving shaft AM and provided with radial arms or trunnions 340, for example three trunnions forming a tripod. Mounted on each arm 340 is a rolling element constituted by two separate sectors of which only sector 310 has been shown in FIG. 1, these sectors each cooperating with a rolling track R formed in a female element (barrel 312) connected to rotate with a driven shaft (not shown).

Elastic expansible bearing bushings are interposed between the arms 340 and the rolling sectors 310, each bushing 320 being formed by two cylindrical semi-bushings 320A and 320B each provided with a curved end edge 330 constituting an anchoring point engaged in an aperture formed radially in the arm 340. The semi-bushings 320A, 320B are elastic and adapted to be capable of radially expanding by a pinching of the associated arm 340 between their ends.

The aperture machined in the arm 340 receiving the anchoring point constituted by the curved edge 330 is angularly offset 90° relative to the mean direction Y—Y' of the load P applied on the bushing 320. Now, in the case where the angularity of the joint is maximum, when the rolling segment 310 journalled on the bushing 320 is in its extreme position and starts its return travel, the force P is shifted to P' and the bushing 320 is uncovered on an arc $\alpha$ exceeding 90°. A frictional force F then appears at the point 500 located at the intersection between the inner surface of the rolling segment 310 and the corresponding semi-bushing 320B. This force F tends to drive the semi-bushing 320B in rotation and causes the creation of a reaction force Q applied on the indexing end edge 330.

With l being the distance between the point 500 and the point of application of the reaction force Q, there results a bending moment Ql at the point 500 in the semi-bushing 320B which bends by modifying its curvature in its zone of entry under the segment 310. This modification of curvature increases in an exaggerated manner the local pressure in this zone 500 and destroys the film of lubricant, which results in a start of seizure between the segment 310 and the semi-bushing 320B. Correlatively, the force retaining the indexing end 330 suddenly increases, as does the bending, which may result in the fracture of the semi-bushing 320B at the point 500.

SUMMARY OF THE INVENTION

An object of the invention is therefore to provide a radially expansible bushing for a homokinetic joint of the type mentioned hereinbefore and which is capable of operating in all the configurations under excellent conditions of reliability with no risk of fracture at maximum angularity of the joint.

The present invention also provides tooling for industrially manufacturing these bushings and their rational assembly on the trunnions of the homokinetic joint, in such manner that their operation be equally satisfactory for all the values of the torque to be transmitted while allowing the formation and conservation of the lubricating film.

According to the present invention, each semi-bushing is provided with a stud for indexing it on the associated arm located internally of said semi-bushing on its axis of symmetry.

Thus, as the anchoring point of each semi-bushing is shifted from its end to its central zone, there can no longer be produced a sudden increase in the retaining force of the indexing element when the joint is at maximum angularity. Consequently, the bending moment liable to cause the breakage of the semi-bushing cannot occur and therefore the bushings may operate in complete reliability in all the configurations of the joint including maximum angularity thereof.

According to an embodiment of the invention, each stud is welded to the inner surface of the associated semi-bushing in the central zone of the latter and slidably engaged in a bore in the arm arranged to be perpendicular to the axis of the latter and coaxial with the axis of symmetry of the semi-bushings, and an elastically yieldable element for returning the semi-bushings to their expanded position is located in this bore which extends throughout the arm.

The tooling according to the invention is adapted to manufacture by a cold drawing operation semi-bushings whose studs are hollow in the form of cups and this tooling comprises a die and a punch for the drawing of a blank.

According to the invention, a recess having a cylindrical inner end is provided in the die and the punch has a corresponding cylindrical contour in which is formed a central annular recess complementary to the configuration of the stud to be drawn placed in the recess of the die.

Further advantages and features of the invention will be apparent from the following description with reference to the accompanying drawings which illustrate several embodiments thereof by way of non-limiting examples.

DETAILED DESCRIPTION OF THE PREFERRED EMBODIMENTS

Figure 2:
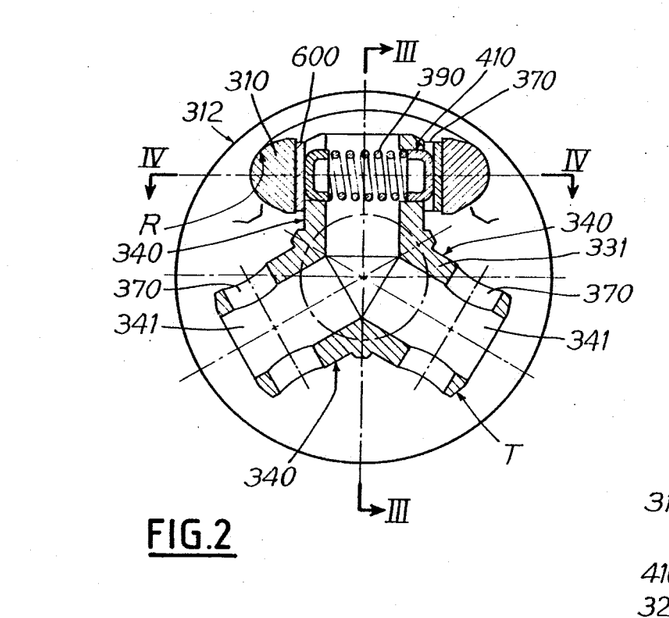
FIG. 2 is a cross-sectional view on line II—II of FIG. 3 of the tripod, of a homokinetic transmission joint of the type shown in FIG. 1 and provided with expansible bearing bushings according to a first embodiment of the invention.
Figure 3:
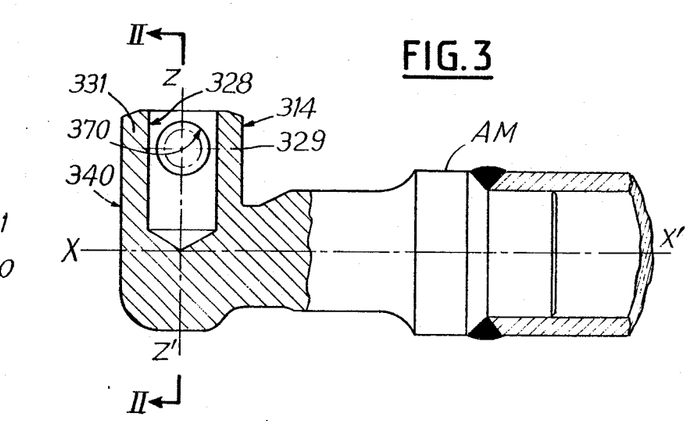
FIG. 3 is a half axial sectional view and half elevational view of the tripod and the corresponding driving shaft taken on line III—III of FIG. 2.
Figure 4:
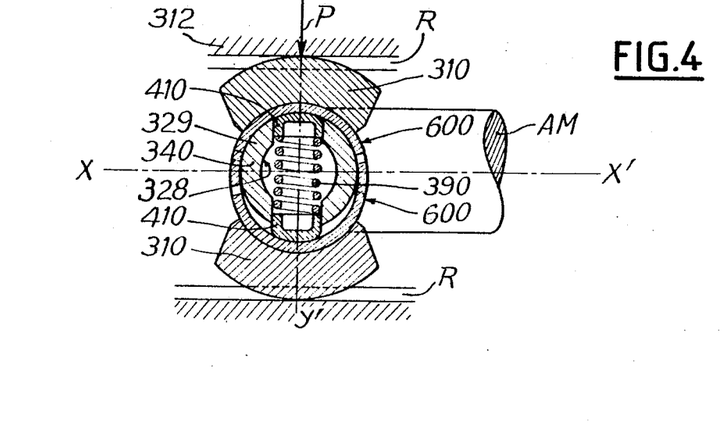
FIG. 4 is a cross-sectional view of an arm of the tripod of FIGS. 2 and 3, taken on line IV—IV of FIG. 2, in a plane parallel to the general axis of the homokinetic joint

In the first embodiment of the joint illustrated in FIGS. 2 to 4, this joint comprises a driving shaft AM provided with an end tripod T constituted by three radial arms 340 each provided with two roller segments 310 rolling on tracks R provided in the barrel 312, an axial bore 341 being provided in each arm 340. The arms 340 are respectively provided with two semi-cylindrical semi-bushings 600 surrounding the associated arm 340 and radially expansible on each side of the latter.

According to the invention, each semi-bushing 600 is provided with a stud 410 for indexing or locating the bushing on the associated arm 340, this stud being located inside the semi-bushing 600 on its axis of symmetry Y—Y' (FIG. 4). In this embodiment, each indexing or locating stud 410 has the shape of a bowl or cup and is welded by its cylindrical outer surface to the inner surface of the corresponding semi-bushing 600 in the central zone of the latter. Further, each stud 410 is slidably engaged in a cylindrical bore 370 in the presently-described embodiment, inside the arm 340 and arranged to be perpendicular to the axis Z—Z' of the arm, and to the axis X—X' of the shaft AM of the homokinetic joint. Each transverse bore 370 contains an elastically yieldable element for returning the two semi-bushings 600 to their expanded position around the trunnion 340, this return element being formed in the presently-described embodiment by a coil spring 390 which bears by its ends against the periphery of the cups 410. The welding of the latter to the semi-bushings 600 may be carried out by any known method, for example by an electric discharge, electronic bombarding, laser, friction, etc.. It should be noted that the lateral surface 420 of the studs 410 is cylindrical so as to avoid any risk of jamming in the bore 370 when the semi-bushings 600 expand radially; this lateral surface may also be spherical, as in a modification which will be described hereinafter.

The purpose of the radial expansion of the semi-bushings 600 is to take up the clearance between the surface 314 of the trunnions 340 and the roller segments 310 which roll along the tracks R.

Note also that, in the embodiment shown in FIG. 2, the axial bores 341 of the arms 340 extend throughout the length of the latter and together open onto the center of the tripod T, while in the modification of FIGS. 3 and 4, these open bores 341 are replaced by blind bores 328. The bores 341 and 328 impart to the arms 340 a certain radial resilient flexibility enabling them to become oval under the effect of the load P received from the roller segments 310 through the semi-bushings 600. The thickness of the walls 329 and 331 of the arms 340 is such that the increase in the radius of curvature under load of these arms corresponds to the increase in the radius of curvature of the corresponding roller segments 310.

Figure 16:
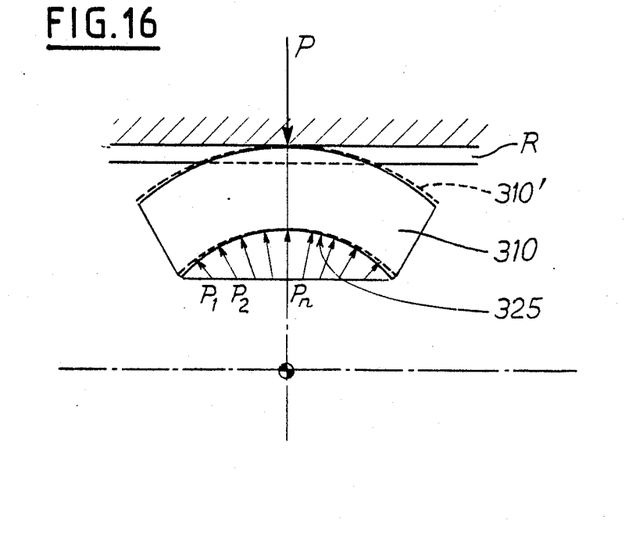
FIG. 16 is a plan view of a rolling segment associated with an arm of the tripod of the joint according to the invention, illustrating the distribution of the forces exerted by this arm on the segment.

The advantage of this feature of the invention is to permit the conservation of a coincidence of curvature between the sliding surfaces of the segment 310 and of the semi-bushing 600 (conformity ratio) and the assurance of the optimum conditions of formation of the film of lubricant. In this way, there is also avoided the phenomenon of the crushing of the film of lubricant as it enters under the segment 310 at 500 (FIG. 1) when this segment 310 is in the position of extreme angularity. Indeed (see FIG. 16), the force P with which the toric segment 310 bears against the rolling track R is transferred by the bore 325 of the segment 310 to the sliding surface of the semi-bushing 600, in the form of a variable pressure $p_1, p_2 \ldots p_n$ in the film of lubricant distributed over the surface of the bore 325 approximately as represented in FIG. 16, the pressure decreasing on each side of the direction of the load P.

Figure 17:
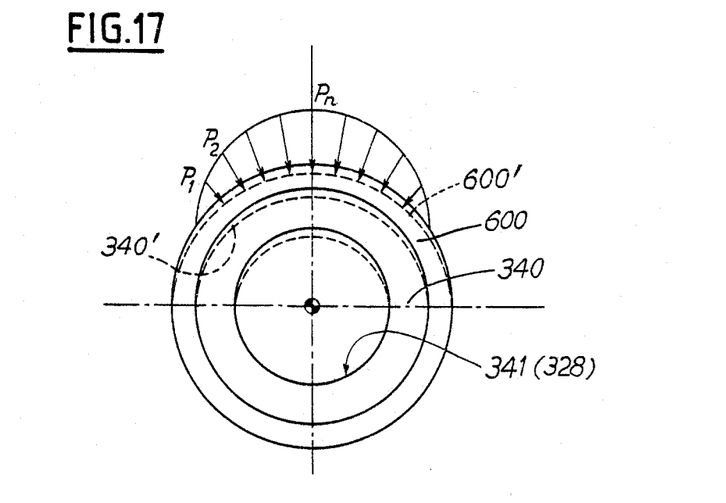
FIG. 17 is a diagrammatic plan view of an arm and an associated bushing, illustrating the distribution of the forces exerted on the bushing and the arm by the corresponding rolling segment.

Consequently, the segment 310 has a tendency to open by bending as shown in dotted lines at 310'. On the other hand, as seen in FIG. 17, the tubular trunnion 340 is subjected, through the semi-bushing 600, to this same pressure P angularly distributed as indicated by the arrows $P_1, P_2 \ldots P_n$, and has a tendency to become oval by assuming the configuration 340' shown in dotted lines while the bushing 600 correlatively assumes the ovalized configuration 600'.

In order to insure that the pressure distribution is optimum for all the values assumed by the force P, it is sufficient to so dimension the bore 341 (or 328) of the trunnion 340 that the radii of curvature of the bores 325 of the segment 310 and of the bearing surface of the corresponding bushing 600 vary in the same proportion for any loads P corresponding to the torques of utilization of the homokinetic joint.

Figure 5:
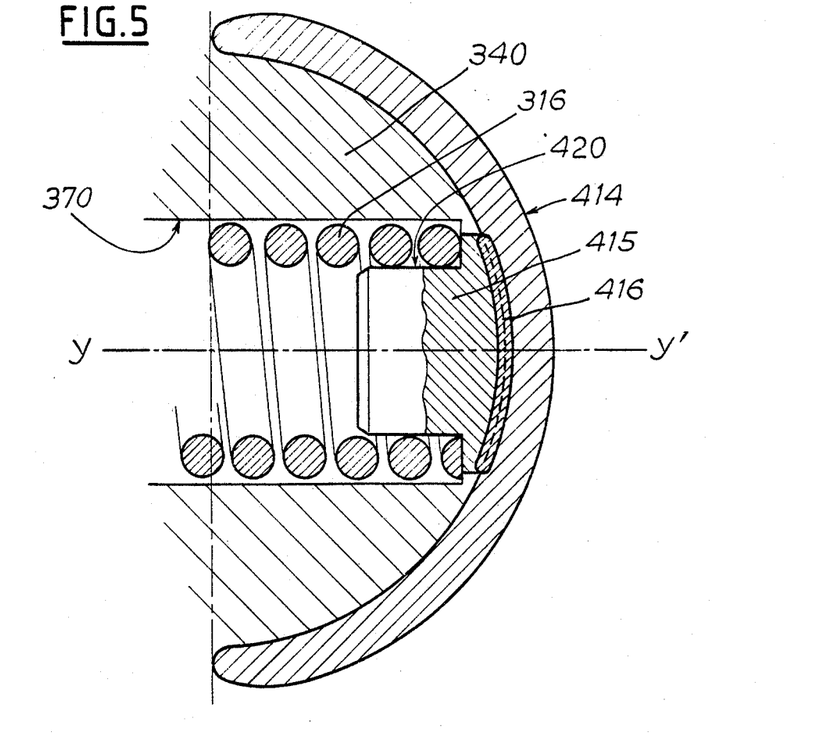
FIG. 5 is a half cross-sectional view to an enlarged scale of an arm of a tripod of the joint provided with a semi-bushing according to a second embodiment

In the embodiment shown in FIG. 5, the bushing 414 is provided with a solid stud or pin 415 having a cylindrical outer surface and fixed to the semi-bushing 414 by a weld bead 416. The stud 415 is centered by its cylindrical lateral surface 420 inside a coil spring 316 the wire of which is round or square, this spring being itself guided inside a transverse bore 370 in the trunnion 340, which is here devoid of an axial bore.

Figure 6:
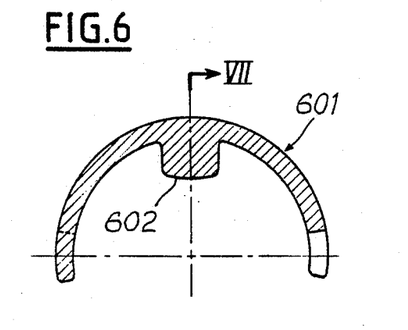
FIG. 6 is a longitudinal sectional view, taken on line VI—VI, of FIG. 7, of a third embodiment of the semi-bushing according to the invention.
Figure 7:
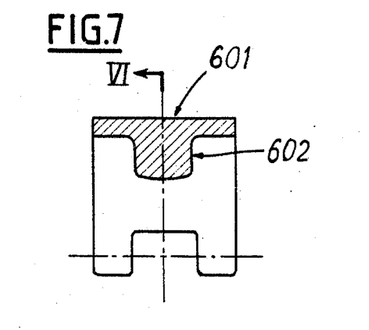
FIG. 7 is a half sectional view and half elevational view taken on line VII—VII of FIG. 5.

FIGS. 6 and 7 show another embodiment of the semi-bushing 601 in which its indexing or locating stud 602 is solid and is an integral part of the semi-bushing 601 with which it is therefore in one piece. The semi-bushing 601 may be made from sintered metal or by a cold forming of steel, brass or any other metals suitable for sliding.

FIGS. 8 to 11 illustrate another embodiment of the semi-bushing 603 which is here provided with a central indexing or locating stud 327 which is hollowed out in the shape of a cup or bowl and is in one piece with the remainder of the semi-bushing 603, and the tooling shown diagrammatically for manufacturing this semi-bushing by a cold drawing or upsetting operation.

Figures 8, 9, 10, 11:
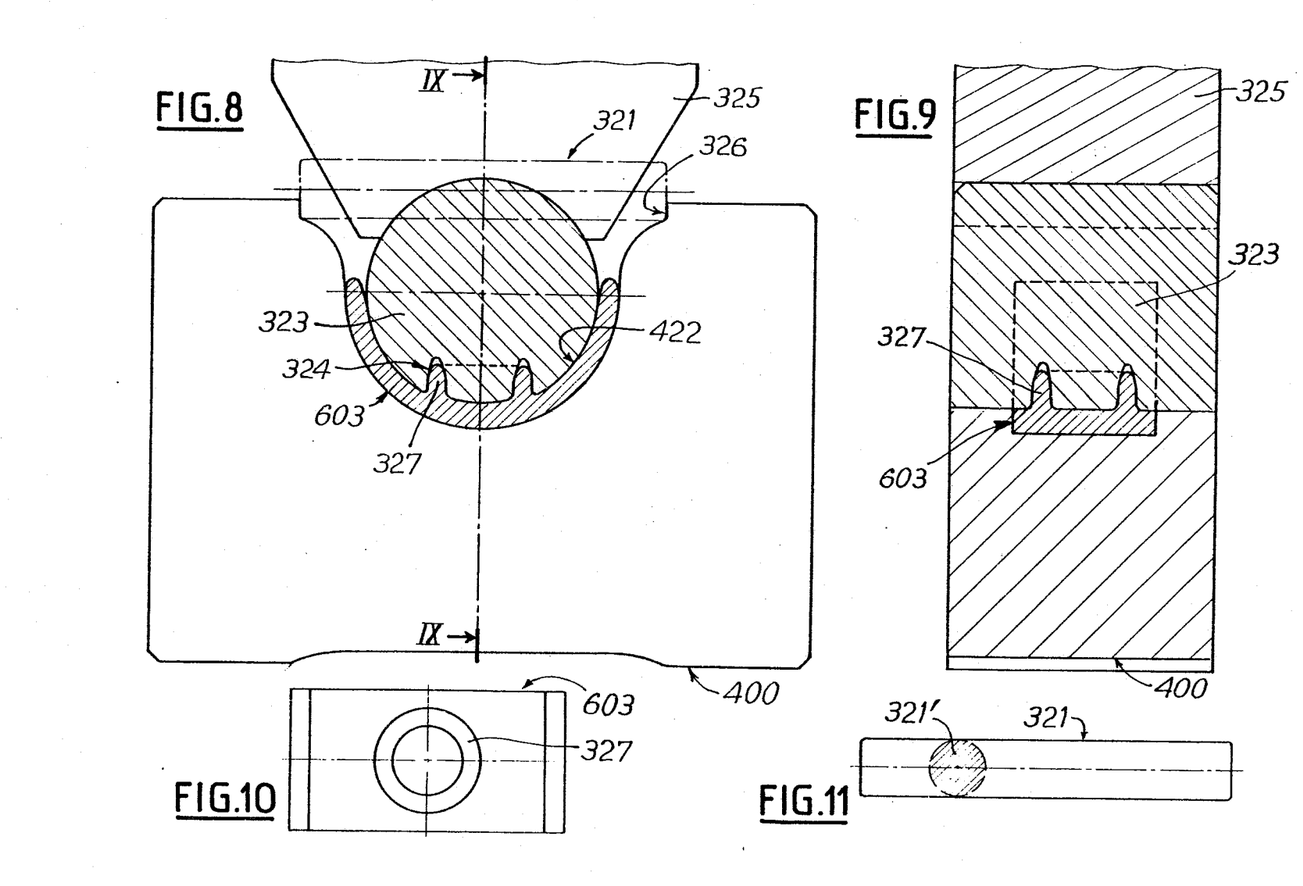
FIG. 8 is an elevational view, partly in section of tooling for manufacturing semi-bushings according to the invention.
FIG. 9 is a cross-sectional view taken on line IX—IX of FIG. 8.
FIG. 10 is an elevational view of the semi-bushing shown in FIGS. 8 and 9.
FIG. 11 is an elevational view of a blank from which the semi-bushing of FIG. 10 is obtained by means of the tooling of FIGS. 8 and 9.

This tooling comprises a die 400 in which is formed a recess 422 having a cylindrical bottom, and a punch 323 fixed to a punch holder 325, the punch 323 having a cylindrical contour corresponding to the recess 422 and in which is formed a central annular cavity 324 which is complementary to the configuration of the stud 327 of the bushing 603 to be drawn. The punch holder 325 transmits to the die 400 the force exerted by a press ram which is constructed in the known manner (not shown).

Before the forming proper, the initial blank is a billet 321 of suitably annealed steel placed on the die 400 between two upper notches 326 defining the recess 422. When the punch 323 descends, the billet 321 is first bent into a horseshoe shape and this billet and its enlarged portion 321' are flattened under a high pressure and the metal is disposed in the annular space 324 and forms the central stud 327 for locating the semi-bushing 603, the latter assuming the configuration shown in FIG. 10 at the end of the forming operation. This tooling and its use afford the following advantages: great strength and reliability of the bushing 603 and the indexing stud 327, polished and glazed sliding surface, reduced manufacturing cost, and a very good geometry of the sliding surface.

Figure 12:
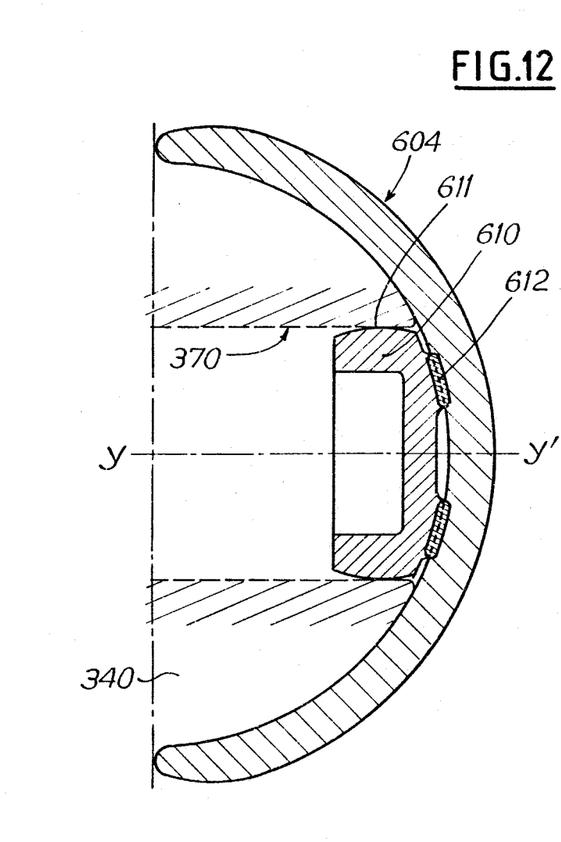
FIGS. 12 and 13 are half cross-sectional views of an arm of a tripod of two other embodiments of a semi-bushing associated with the tripod.

FIG. 12 shows a modification of the bushing 604 in which the latter is provided with an indexing or locating, stud 610 in the shape of a cup or bowl having a spherical lateral surface 611 slidable in the transverse bore 370 in the arm 340. The stud 610 is welded to the inner surface of the semi-bushing 604 by an annular surface 612 located in the central zone of the semi-bushing and substantially coaxial with its axis Y—Y'.

Figure 13:
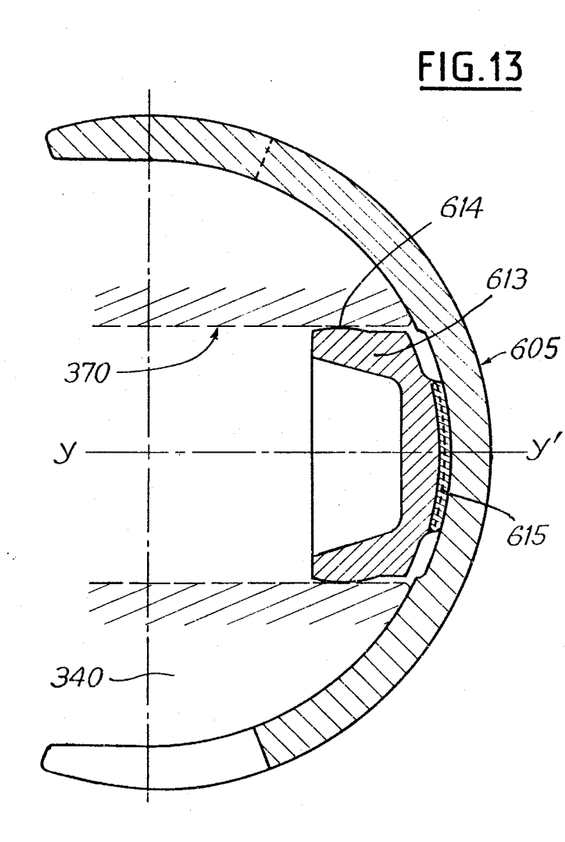

FIG. 13 shows another modification in which the semi-bushing 605 is provided internally with an indexing or locating stud 613 in the shape of a cup having a lateral surface only a part 614 of which closest to the axis of the arm 340 is cylindrical and slidable on the surface of the inner bore 370. The stud 613 has, in facing relation to the semi-bushing 605, a central cylindrical projection or boss 615 which is welded to the inner surface of the semi-bushing 605.

Figure 14:
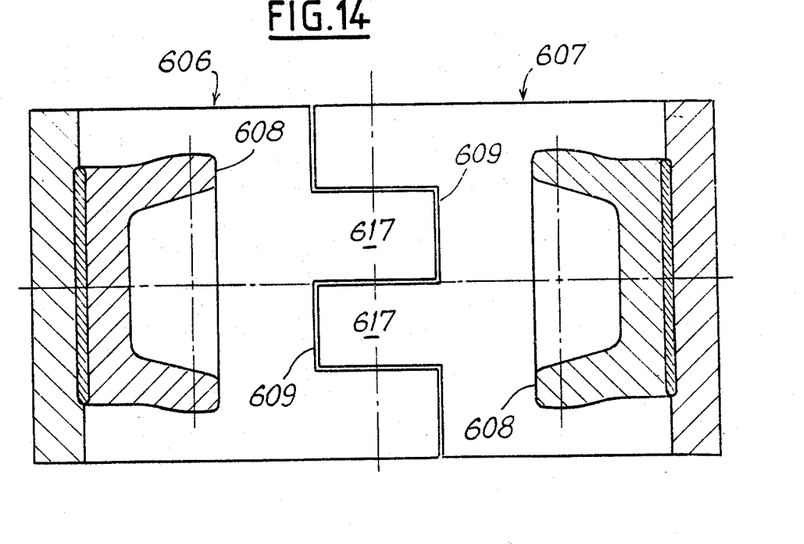
FIGS. 14 and 15 are side elevational views of two other embodiments of two bushings associated with the same arm of the tripod, showing in section the corresponding indexing studs in a plane containing the axis of the arm.
Figure 15:
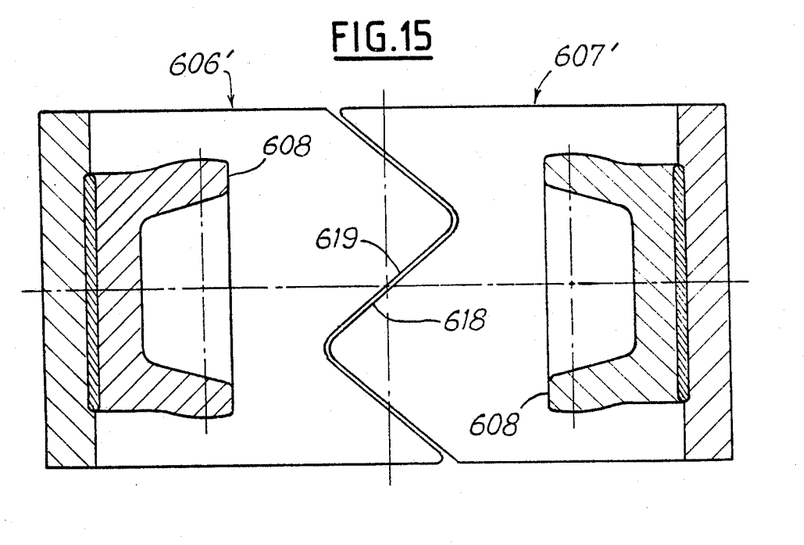

FIGS. 14 and 15 illustrate two other embodiments of semi-bushings according to the invention in which the confronting end portions of two bushings mounted on the same arm are so shaped as to mutually fit together and define guide surfaces. Thus, in the modification shown in FIG. 14, the two associated semi-bushings 606, 607, provided with studs 608 in the shape of cups welded to the inner wall of the respective semi-bushings, include end portions in which are formed grooves 609 receiving conjugate tongues 617, each end portion being provided with one tongue 617 and one groove 609.

In the modification shown in FIG. 15, the semi-bushings 606', 607' have end portions provided with complementary chevrons 618, 619. In both cases, the end portions of the semi-bushings suitably shaped in this way provide a mutual guiding of the semi-bushings and a continuous bearing surface for the rolling segment when the two semi-bushings radially expand.

The shaped bearing bushings of the invention may be made, as already mentioned, from sintered metal or by a cold forming of steel or other metals suitable for sliding, but they may also be formed from steel covered with an anti-friction layer of a suitable more malleable metal or a plastics material such as "Nylon". The semi-bushings may be thick since they are not required to have any particular elastic feature.

Moreover, in the case where needles are interposed between the rolling segments 310 and the semi-bushings (600, 414, 601, . . . ), the features according to the invention permit an even distribution of the loads on the needles, independently of the torque to be transmitted.

In all the embodiments mentioned hereinbefore, the operational reliability of the bushings is insured and risks of breakage of the latter when the homokinetic joint operates at maximum angularity are therefore avoided owing to the indexing or location of the semi-bushings on their axes of symmetry.

While the present invention has been described with reference to the foregoing embodiments, it will be understood that various changes and modifications may be made thereto which fall within the scope of the appended claims.

What is claimed is:

1. A homokinetic transmission joint comprising a male element for connection to a driving shaft and having radial arms, a rolling element mounted on each arm, a female element for connection to a driven shaft and defining pairs of rolling tracks, the rolling elements being trapped in respective pairs of said rolling tracks, expansible elastically yieldable bushings interposed between the radial arms and the rolling elements, each rolling element comprising two separate rolling segments each cooperative with a rolling track of the respective pair of rolling tracks, each bushing comprising two semi-cylindrical semi-bushings provided with first connecting means for preventing movement of the semi-bushings along and around the respective arm, each arm being provided with complementary second connecting means cooperative with said first connecting means, said two semi-bushings being radially expansible by a pinching between ends of the semi-bushings of the respective arm on which they are mounted, said first connecting means of each semi-bushing comprising a stud for locating the bushing on the respective arm, said stud being located on the interior of said semi-bushing on an axis of symmetry of said semi-bushing.

2. A transmission joint according to claim 1, wherein each stud is welded to an inner surface of the associated semi-bushing in a central zone of the semi-bushing, and said second connecting means comprises a bore in the respective arm positioned perpendicular to the axis of the arm receives said stud in sliding relation to said bore, said bore being coaxial with the axis of symmetry of the semi-bushing, an elastically yieldable return element being disposed in said bore for returning the semi-bushings to an expanded position thereof.

3. A joint according to claim 2, wherein said studs are solid and welded by bases thereof to the respective semi-bushing .

4. A joint according to claim 3, wherein said studs are welded along annular surfaces thereof.

5. A joint according to claim 3, wherein said studs are welded by central projecting portions of the studs.

6. A joint according to claim 2, wherein said studs are in the shape of cups open in the direction of said bore and welded by bases thereof to the respective semi-bushing.

7. A joint according to claim 6, wherein said studs are welded along annular surfaces thereof.

8. A joint according to claim 6, wherein said studs are welded by central projecting portions of the studs.

9. A joint according to claim 1, wherein said studs have a spherical lateral surface.

10. A joint according to claim 1, wherein said studs have a cylindrical lateral surface.

11. A joint according to claim 1, wherein each stud is an integral part of the respective semi-bushing and is solid.

12. A joint according to claim 1, wherein each stud is an integral part of the respective semi-bushing and is in the shape of a cup.

13. A joint according to claim 1, wherein the locating studs are made from a metal suitable for sliding and are covered with a malleable metallic anti-friction layer.

14. A joint according to claim 1, wherein the locating studs are made from a metal suitable for sliding and are covered with a plastics material.

15. A joint according to claim 1, wherein confronting end portions of two semi-bushings mounted on the same arm are so shaped as to mutually fit together and define guide surfaces.

16. A joint according to claim 15, wherein said guide surfaces are complementary grooves and tongues.

17. A joint according to claim 15, wherein said guide surfaces are chevrons.

18. A joint according to claim 1, comprising, in each radial arm of the male element, an axial passageway communicating in the center of said male element with the passageways of the other arms, said passageway being so dimensioned that the thickness of walls surrounding the passageways of the arms is such that an increase in the radius of curvature under load of said walls corresponds to an increase in the radius of curvature of the respective rolling segment.

19. A joint according to claim 1, comprising, in each radial arm of the male element, a blind axial bore which is so dimensioned that the thickness of walls surrounding the passageways of the arms is such that an increase in the radius of curvature under load of said walls corresponds to an increase in the radius of curvature under load of the respective rolling segment.

* * * * *